June 14, 1966 H. TÖPFER ETAL 3,256,392

CIRCUIT ARRANGEMENT FOR DETERMINING PARTY LINE SUBSCRIBER NUMBERS

Filed Sept. 13, 1962 3 Sheets-Sheet 2

United States Patent Office 3,256,392
Patented June 14, 1966

3,256,392
CIRCUIT ARRANGEMENT FOR DETERMINING PARTY LINE SUBSCRIBER NUMBERS

Herbert Töpfer, Unterpfaffenhofen, and Wolfgang Papke, Günter Raab, and Gerhard Polensky, Munich, Germany, assignors to Siemens & Halske Aktiengesellschaft, Berlin and Munich, Germany, a corporation of Germany Filed Sept. 13, 1962, Ser. No. 223,500
Claims priority, application Germany, Sept. 29, 1961, S 76,041
16 Claims. (Cl. 179—17)

The invention disclosed herein is concerned with a circuit arrangement for determining the numbers of subscribers in communication systems and especially of subscribers connected to party lines in telephone systems.

The determination of the subscriber numbers in connection with party lines generally is quite difficult, since each party line is provided with only one line circuit and having only one input which is connected with a preselection device, for example, with line finders. To enable determination, with economical means, of the individual subscriber numbers, despite this situation one of the ordinal numbers "1" to "0" may be assigned to each subscriber—a maximum of ten subscribers on a party line—such ordinal number being dialed by the respective subscriber, or being automatically transmitted, upon extension of a call. In a known circuit arrangement operating in accordance with this principle, there are provided coordinate marking devices, corresponding in number to the largest number of subscribers on a party line, for determining the numbers or portions thereof, only that coordinate marking device becoming in a given case operatively effective, dependent upon a device which ascertains the ordinal number of a subscriber involved in extending a call, which corresponds to the respective ordinal number. Since it is possible to definitely ascertain with a coordinate marking device, according to the two coordinates thereof, only two digits, a further coordinate marking device is required for each further pair of digits. The decoupling of the individual coordinates of the corresponding devices effected in known manner by means of rectifiers, resistors or the like.

The object of the present invention is to reduce the expenditure required in connection with the above indicated known arrangement. This is achieved by the provision of only one single transformer matrix, known as such, having a number of element columns corresponding to the index of the highest subscriber number, such element columns designating the individual decades, and having a plurality of element lines designating the individual digit values per decade, whereby the marking conductor, provided for each subscriber number, which is with the transformer elements, for example, ferromagnetic ring cores of the repeater matrix, in known manner linked according to the respective number, is connected over a decoupling element with the terminal point of the line to be identified, the marking conductors of subscriber lines of identical ordinal number being at their free ends fixedly connected, and being connectible with a terminal of the current source which supplies the identification signal, over an allotter contact which operates in known manner, while the other terminal is in a given case switched through to the identifying connecting point.

Transformer matrices made, for example, in the form of ring core evaluation circuits, for the identification of subscriber numbers are already known. It is for the satisfactory operation of said repeater matrices assumed that only one single conductor will always be operatively effective, because several ring cores per column would otherwise be energized, which would result in the recording of an ambiguous signal by the signal receivers engaged in the evaluation. In the ring core evaluation devices used until now for the identification of the numbers of individual subscriber lines, this requirement was met solely by the provision of only one single marking conductor for each subscriber line.

However, for the identification of the subscriber numbers connected to party lines, there are connected to a line up to ten marking conductors. It is of course readily possible, as in the known arrangement, to provide a number of ring core evaluation circuits corresponding to the maximum number of subscribers on a party line. However, this does not result in reducing the expenditure. The separate switching through of individual marking conductors connected with one and the same line, with the aid of switching means, for example, relays, which are individual to a line, would in the case of a single ring core evaluation circuit likewise call for a considerable expenditure.

The combination of the individual marking conductors corresponding to the individual ordinal numbers allotted to the subscriber numbers, and the switching through over an allotter contact, as in the known circuit arrangement, which uses only one single ring core evaluation circuit, and which is for the identification of the party line subscribers operative, responsive to the actuation of the respective allotter contact, does not readily lead to the desired result. The definite identification of the individual subscriber numbers is with these transformer matrices only possible by effecting a further decoupling of the marking conductors, by means of glow lamps, rectifiers and the like, so as to obtain a blocking of the additional marking conductors which are respectively serially circuited and extend in parallel to the marking conductor which is to be identified. The circuit thus obtained is considerably simpler than that of the known arrangement. Moreover, there is, with little additional expenditure, the possibility of using, for the identification of the numbers of party line subscribers, available identification devices provided with transformer matrices.

The identification of the numbers of individual lines may be effected in similar manner, by connecting the marking conductors thereof with the terminal points, similarly as in the case of party line subscribers, each over a decoupling element, and connecting them together at the free ends thereof, in their totality or subdivided into groups, for example, individual subscriber lines, lines of public pay stations, and the like, whereby the switching through of the respectively interconnected ends of the conductors, to the current source, is effected over allotter contacts which are actuated in a manner similar as the allotter contacts of party lines. In order to avoid the use of additional allotter contacts, the free ends of the marking conductors of individual lines can be connected together in groups, each with identical number of conductors, whereby the loops of each group are switched through to the current source over already available allotter contacts.

There are two possibilities for switching through the free terminal of the curent source which delivers the identification signal for the marking conductor of the transformer matrix.

One possibility resides in switching such terminal through to the terminal which marks the line which is to be identified, responsive to the actuation of a switching member, for example, a relay, transistor and the like, which, actuated by a demand or call signal which is in known manner, is transmitted from the calling end of a connection.

The other possibility resides in effecting the switching through of such terminal or the current source which delivers the identification signal, to the terminal which marks the line to be identified, from any desired point of an existing connection, for example, in the case of outgoing toll calls, from a point in the call metering circuit, over the trunk line extending to the calling subscriber line. The switching member which is otherwise required respectively for each subscriber line or the corresponding line circuit, can be omitted in such a case, since the identification circuit is immediately switched through over the trunk line, there being no call or demand signal transmitted. The omission of the respective switching member also reduces the time required for the determination of a line number by the interval which is in the first noted embodiment consumed in the operation of such switching member.

The signalling can be effected, in the second noted embodiment wherein the evaluation loops are closed over trunk lines, depending upon the kind of telephone system involved, either directly over the line conductors of the respective connection, by simultaneous connection to such conductors, of the current source which delivers the identification signal, or else over a control- or private conductor, for example, the socalled c-conductor, which extends through all selection stages.

In order to avoid, in the signalling over a private conductor, interference of the respective identification circuit extending thereover, with the signal circuits serving for the general building up of calls and likewise extending over such conductor, the current source which delivers the identification signal is, according to another feature of the invention, serially connected with the respective private conductor and with the direct current source which serves for supplying the seizure or private relays lying on the corresponding private conductor.

In order to assure extension, to the private conductor, of the counter potential which is required for the holding of the control- or seizure, relays lying on such private conductor, the connection of the signal current source is, according to a further feature of the invention, effected over a transformer, whereby the secondary winding thereof is disposed in a series circuit including the respective private conductor and the direct current source serving for supplying the relays, lying on the private conductor, or else, an appropriately polarized rectifier is disposed in parallel with the signal current source.

The signal current source, in the latter above noted case, is advantageously formed by an impulse generator and is polarized so that the identification impulses are not suppressed by the parallel connected rectifier.

Voltage dependent as well as current direction-dependent resistances, for example, glow lamps, Zener diodes or rectifiers or the like, may in all cases be used as decoupling elements. Rectifiers are considered as being particularly suitable in cases in which the identification current circuit extends over the private conductor of a trunk line, such rectifiers, in simple manner, making it possible to avoid mutual interference between the identification current circuit and the remaining control current circuits.

Another general advantage results in the use of rectifiers as the blocking resistances thereof can be readily checked, such checking being effected in simple manner by the use of signal receivers, which are connectible to the transformer elements of the transformer matrix, and provided with switching means, whereby the input voltages of one or the other orientation can be evaluated.

Further details of the invention will appear from the description which is rendered below with reference to the accompanying drawings, showing only the switching and circuit elements which are required for an understanding of the invention and the functions involved.

Figure 4:
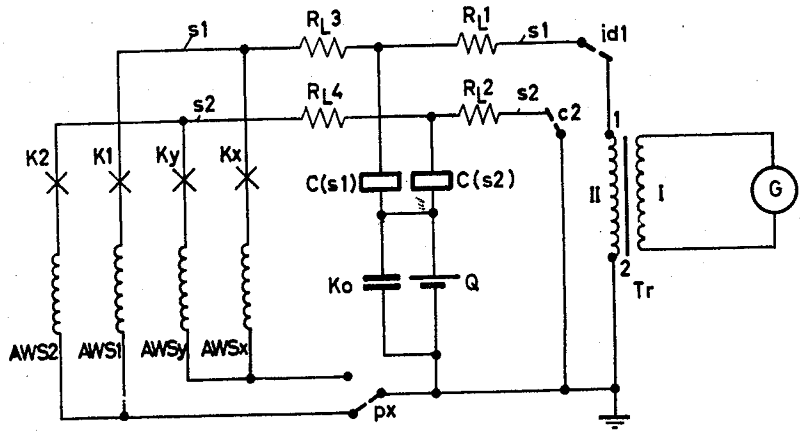
Figure 2:
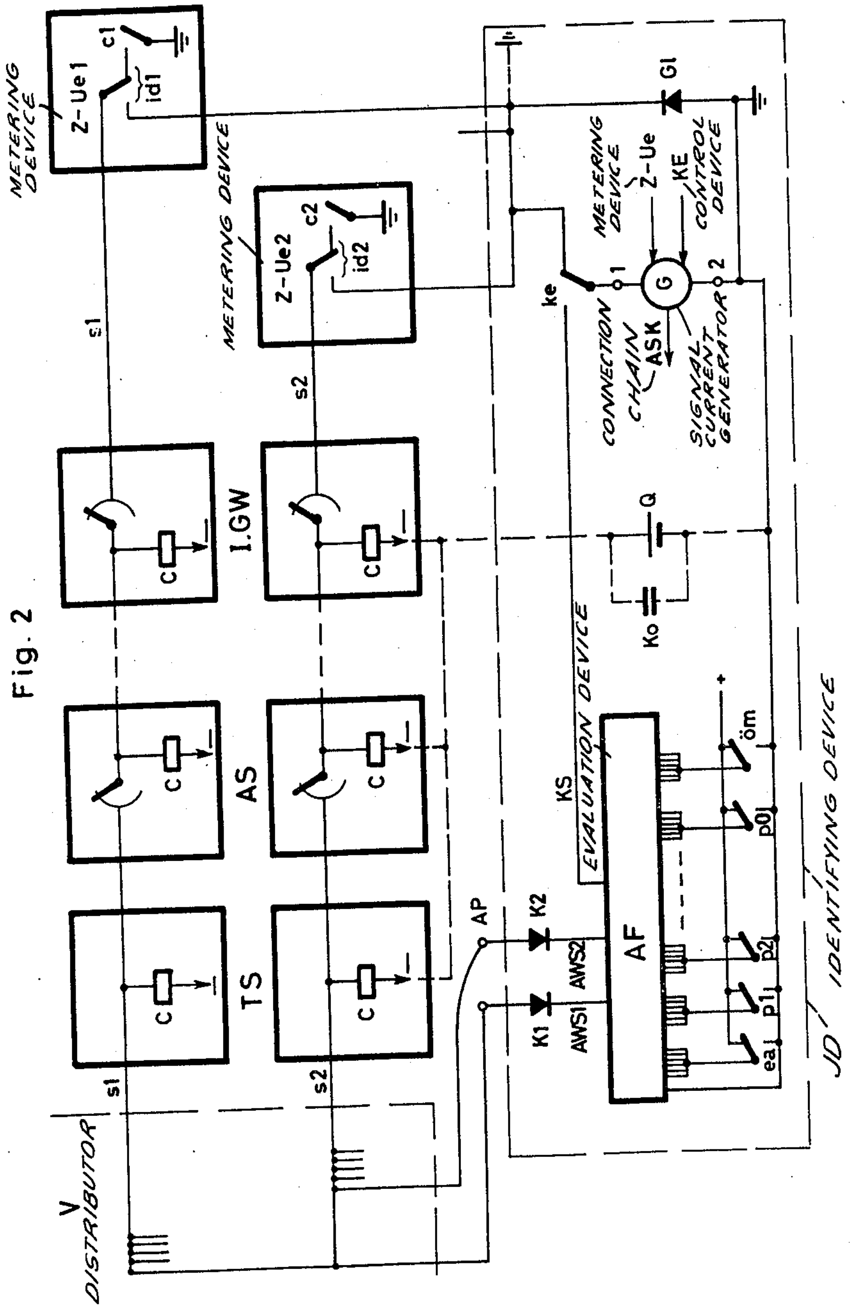
FIG. 2 represents the course of the signal current circuits during an identification operation, the reference JD indicating an identification device, and the reference G indicating a signal current source.
Figure 3:
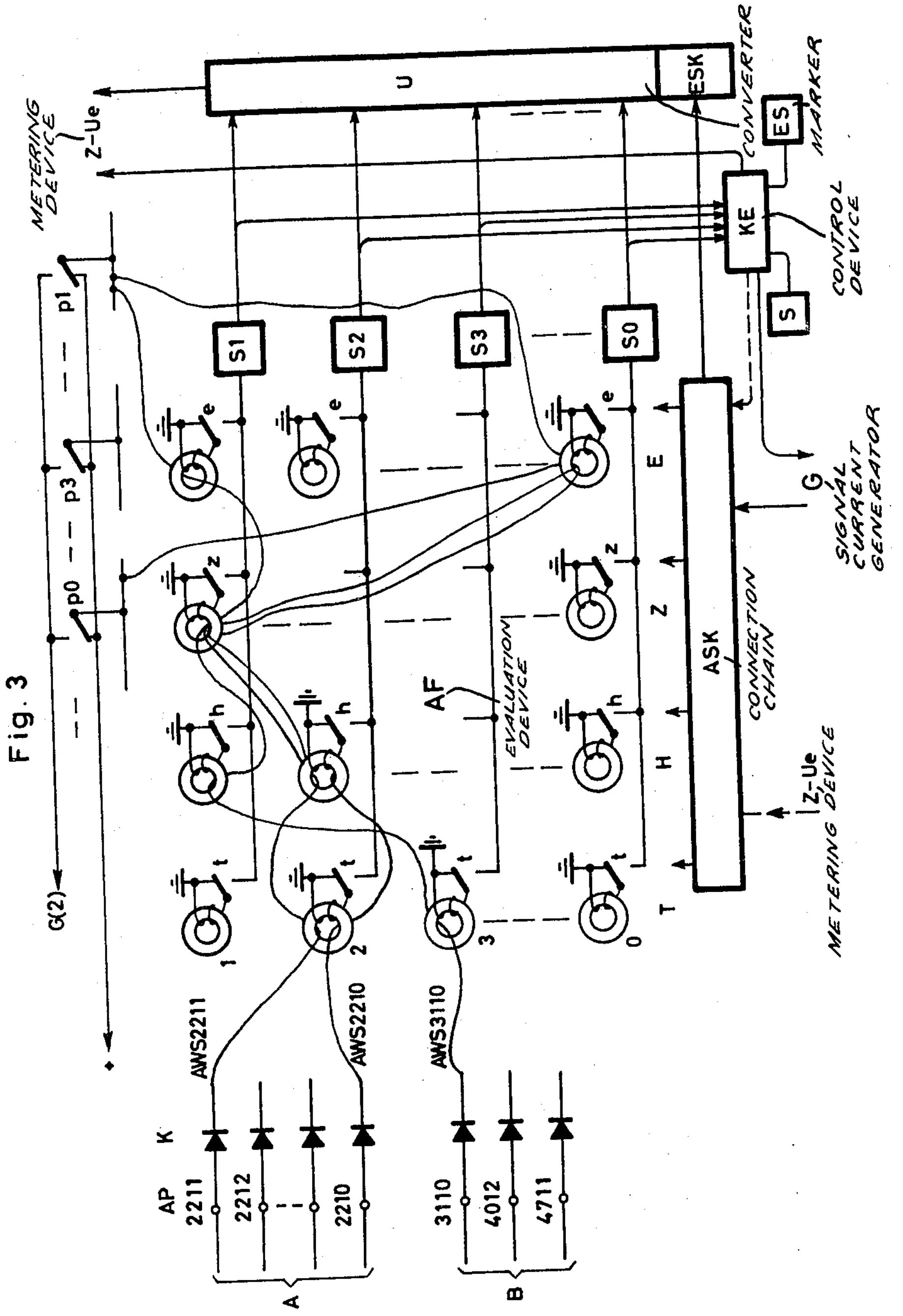

FIG. 3 illustrated further details of the identification device JD of FIG. 2; and FIG. 4 shows a simplified substitution circuit, corresponding to FIG. 2, for a desired current direction of the signal current source G and also showing desired decoupling elements, to demonstrate further advantages that may be obtained by employing current direction-dependent resistances.

Figure 1:
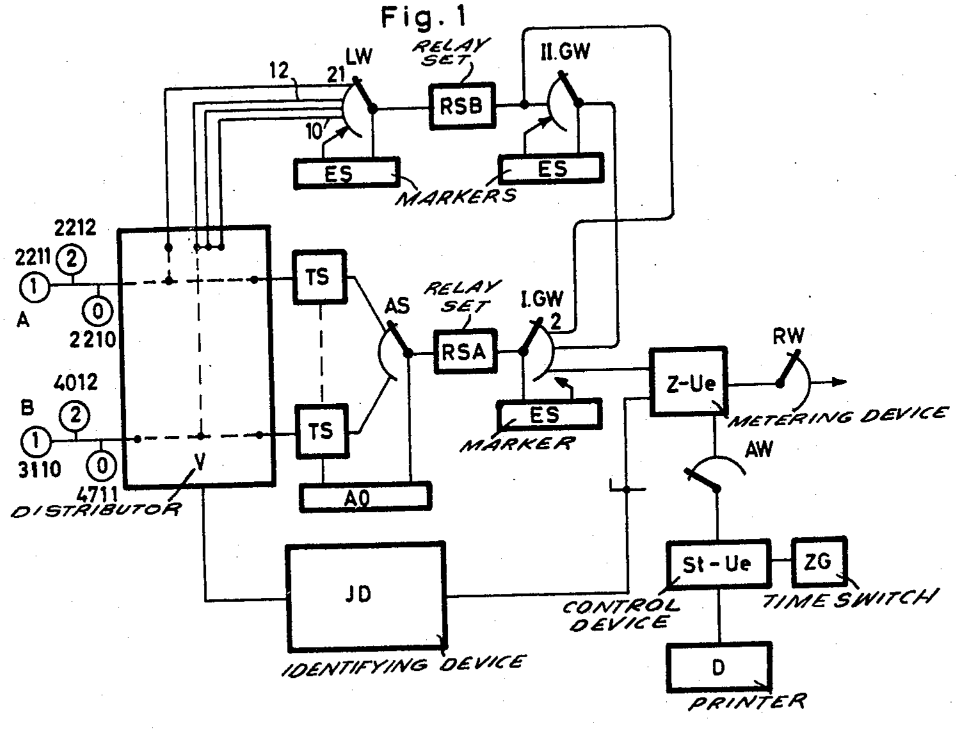
FIG. 1 shows in block diagram manner a system in which the arrangement according to the invention can be incorporated, a private conductor being indicated as being extended through all selection stages.

Referring now to FIG. 1, characters A and B indicate two party lines. The four-digit index numbers represent the call numbers allocated to respective individual party line subscribers, while the numbers 1 to 0 appearing in the circles denote the ordinal numbers of the respective subscribers, only three of ten subscribers being in each case indicated in the drawing. The connector LW has one output LW21 over which the party line A can be reached, while being provided with outputs which are respectively allocated to the individual subscriber stations on the party line B. Only one line circuit TS is provided for each party line, the outputs of the respective line circuits being connected with bank contacts of line finders such as AS.

The known operations taking place incident to the extension of a call, for example, from the station 2211 of the party line A to the station 3110 of the party line B, are as follows: The line circuit TS associated with the party line A is actuated responsive to removal of the receiver at the station 2211, triggering the call alloter AO which causes an idle line finder AS to hunt for and connect with the calling line.

The corresponding line finder AS extends the calling line 2211 to the relay set RSA which, in known manner, is effective to provide battery feed, to connect the dial tone, and to control the building up or extension of the call, such operations also including the storing of the incoming selection pulses and further extension thereof by means of an impulse repeater.

As soon as a complete selection impulse series is present in the impulse repeater of the relay set RSA (at the conclusion of the dialing operation at the calling station), a signal is given to the marker ES of the next successive selection stage, that is, the first group selector I.GW, such marker ES evaluating the received digits and causing, in known manner, the setting of the corresponding group selector which is connected therewith. The marker ES associated with the first group selector is released after the call has been extended to the second group selector II.GW of the next selection stage. The group selector II.GW and the connector LW are operatively set in similar well known manner. These last noted selection stages are likewise provided with markers ES.

The connector marker is operated twice according to the tens and units digits of the called line, thereupon transmitting a signal to the relay set RSB, the latter taking over, from the relay set RSA, the battery feed for the calling station 2211 and causing the relay set RSA to switch the line conductors through.

In case of a call in opposite direction, there would be seized a relay set RSB, upon the setting of the first group selector I.GW to the decade "2," bypassing the second group selector II.GW. The last digit is in known manner processed by a relay in the connector LW, which effects the selection, from the subscriber stations accessible over the same line, of the desired party, by operatively connecting a ringing generator.

In the case of outgoing traffic, and after evalution of the first selected digit, for example, digit "0," the first group selector I.GW will seize the charge metering device Z–U*e* with the direction selector RW. The charge metering device Z–U*e* contains means for storing the information and the values required for the metering of calls, including the number of units to be charged, the number of the desired subscriber, the direction marking number with the aid of which the direction selector RW is set, and the number of the calling subscriber.

The number of the calling subscriber is responsive to a signal from the metering device Z–U*e* determined by the identifying device JD which has access to the distributor V. Upon conclusion of a call, a signal is in known manner given to the central ticketing printer D connected with the control device S*t*–U*e* and the time switch ZG. The connection is effected by a connecting switch AW.

FIG. 2 represents, as already mentioned, the course of the signal current circuits during the identification operation. There are shown two private or control conductors *s*1 and *s*2 which extend from the distributor V respectively to the charge metering devices Z–U*e*1 and Z–U*e*2, reference characters C indicting the seizure of private relays lying in the individual selection stages on the respective private conductors. Upon seizure of the charge metering devices and consequent energization of relays C included therein (not shown), the contacts *c*1 and *c*2 will be closed to place ground on the respective private conductors *s*1 and *s*2, thereby maintaining in known manner the connections extending from the calling subscriber to the charge metering devices. A signal is at the same time in known manner given to effect the seizure of the identificaton device JD, and contacts *id*1 and *id*2 are closed for connecting the signal current source G to the private conductors *s*1 and *s*2 which carry the signal current during the identification operation. The signal current circuit also extends from the distributor V over the marking conductors AWS1 and AWS2 of the evaluation device AF, decoupling elements K1 and K2 being associated with these marking conbductors, and over contacts *p*1 to *p*0, for subscribers on party lines, and contact *ea*, for individual subscribers, respectively, back to the signal current source G.

A desired frequency or impulses of one or the other polarity, may be used as a test signal for the identification. It is to be observed, however, that the control circuits extending over the control or private conductors must not be affected by the identification current circuit. Mutual interference between the various current circuits is prevented by connecting in a series circuit the signal current source G, the control or private conductors *s* and the direct current source Q which supplies the relays lying on the respective private conductor. However, care must be taken so that the counter potential, ground in the illustrated case, which is required for holding the relays lying on the respective private conductors, is maintained over the circuit extending from the signal current source G to the private conductors.

If the counter potential were, analogously to the ground connection over the contacts *c*1 or *c*2 of the respective charge metering devices Z–U*e*1 and Z–U*e*2, connected directly to the terminal 1 of the signal current source G, as it might suggest itself, all marking conductors AWS connected with the same allotter contacts would be simultaneously energized in a case in which several charge metering devices are simultaneously in operation. This may be illustrated by the following example:

FIG. 2 shows for the above postulated case, in dotted lines, a ground connection on the terminal 1 of the signal current source G, such ground connection being in the assumed case connected over contacts such as *id*1, *id*2 of the respective charge metering devices Z–U*e*1 and Z–U*e*2. Upon assuming now that the subscriber station connected to the charge metering device Z–U*e*1 is to be identified while the subscriber connected to the charge metering device Z–U*e*2 is engaged in a call, there will result for the identification signal the following circuit:

1.

$$G\text{ (terminal 1)},\ ke,\ \text{ground},\ \frac{id1,\ s1,\ K1,\ AWS1}{c2,\ s2,\ K2,\ AWS2},\ px,\ G\text{ (terminal 2)}$$

This would result in identical energization of the marking conductor AWS1 and AWS2 and therewith in an ambiguous identification result.

The ground connection to the private conductor is in the illustrated example effected over a rectifier G1 which is connected in parallel with the signal current source G. The signal current source G is advantageously constructed as an impulse generator with positive potential on the terminal 1 thereof. A frequency generator would likewise operate as an impulse generator since the negative half waves would be short circuited over the parallel connected rectifier G1.

Another possibility resides in connecting the signal current source G over a transformer. However, upon using in such case a frequency- or impulse generator with opposing polarization, attention would have to be paid to place the voltage amplitudes, with consideration of the relays on the private conductor which carries the identification signal, so that holding of these relays is secured even during the negative half waves or impulses, respectively. In such case would result, for example, the following circuit:

2.

$$G\text{ (terminal 2)}\text{—ground},\ \frac{Ko,\ \dfrac{C(TS)}{\dfrac{C(AS)}{C(I.GW)}}}{px,\ AWS2,\ K2},\ s2,\ id2,\ ke,\ G\text{ (terminal 1)}$$

wherein the relays C lying on the private conductor, for example, the private conductor *s*2, are oppositely energized over the direct current source Q which is by the capacitor K*o* short circuited for alternating current. The decoupling rectifiers K1 and K2 would have to be polarized in reverse direction in such a case.

As noted before, FIG. 3 shows further details of the identification device JD discussed above with reference to FIG. 2, such details being as such known. The evaluation device AF comprises a ring core matrix which is according to the four digit numbers subdivided in four columns T, H, Z and E, corresponding to the thousands-, hundreds-, tens- and units digits, and into ten lines, corresponding to the ten different numerical values of the respective digits. In the normal or resting condition, the individual ring cores are short circuited over the contacts *t*, *h*, *z* and *e*, which are respectively cooperatively associated therewith, and such ring cores are therefore inoperative. The marking conductors of the party line stations A and B (FIG. 1) are in known manner linked with the ring cores allocated to the station numbers, for example, by being simply threaded through the respective ring cores; for example, the marking conductor AWS2211 is linked with the ring cores T2, H2, Z1 and E1. The connection of the signal receivers S1 to S0 is controlled by the connection chain ASK. The operation is, in general, as follows:

The operation of the connection chain ASK is started upon operative connection, over a contact such as *id*1 or *id*2 in the charge metering device Z–U*e*, of the signal current source G. The operative release of the ring cores lying along the column T, and the operative connection of the signal receivers S1 to S0, are effected incident to the first switching step executed by the connection control chain ASK. The result obtained is extended over the converter U to the storer S*p* and also to the common control device KE. The setting of the control chain ESK, for the digit-true extension of the respective values, to the storer, is effected coincident with the setting of the connection control chain ASK. If the result registered by the corresponding signal receiver is definite—only one signal receiver has registered a signal—the control device KE will cause the connection chain ASK to execute the second test step.

In the event that two or more test receivers are simultaneously energized, in the column that is just being tested, for example, column H, other cores, in addition to the core which had been activated by the identification loop, for example, the core H2, will be activated over coupling paths or due to an interference pulse, and will erroneously deliver a signal. The result is therefore ambiguous. The control device KE effects in such a case repetition of the evaluation operation for the corresponding decade (column) or for the entire identification operation, and deletion of the stored ambiguous result, since it may be assumed that the identification will in all probability proceed satisfactorily upon repetition thereof, in a case in which the ambiguous result was due to interference effects, for example, due to switching clicks on the subscriber line, or the like.

In case an ambiguous result is, due to interference effects over coupling paths, again obtained in the repetition procedure, the corresponding subscriber line is disconnected from the charge metering device, the subscriber being consequently compelled to notify the supervisor at the exchange.

However, in the event that all test receivers remain ineffective during the testing operation, there may be some trouble in the identification apparatus. The control device KE will in such a case initiate an internal checking operation of the identification apparatus. The generator G is for this purpose switched over to the control conductor KS (FIG. 2), which is linked with all cores of the ring core evaluation field, thereby activating all cores, so that all ten test receivers must energize incident to a test check of the column, provided that all test- and connection members involved are in proper operating condition.

If the internal checking indicates the presence of trouble in the identification device, substitute test- and connection devices ES (FIG. 3) will be put in operation. If such devices are not available or not provided for, the calling subscriber is connected through to an operator who proceeds to extend the desired call. The partially stored subscriber number is at the same time deleted and the device S is caused to release a trouble signal.

The subscriber is however also connected with an operator, if the internal checking indicates that all involved test- and connection devices operate properly, showing that there is no internal trouble.

The above described control of the connection chain ASK, depending upon the charge metering device Z–U*e*, at the beginning of the identification operation, while depending upon the control device KE for continuing the identification, is appropriate, especially when using frequency generators jointly with voltage dependent resistances as decoupling elements.

However, upon using impulse generators jointly with current direction-dependent resistances, as represented in the drawings, the connection chain is appropriately controlled by the impulse generator G, such generator being triggered by the charge metering device at the beginning of the identification operation, and the further impulse generation being controlled by the control device KE. This results in the advantage of delaying in simple manner, by the action of the respective contacts *t*, *h*, *z* and *e*, of the connection chain ASK, the operative readying of the signal receivers S1 to S0 with respect to the instant of operative connection thereof, a control impulse derived from a signal impulse of the generator G being utilized for this purpose. The switching time of the rectifiers which are used as decoupling elements can be equalized in this manner and the ratio of operatively effective working signal to an interference signal can be considerably improved.

In order to obtain for the rectifiers blocking resistances which are constant as to time, it is moreover of advantage to construct the allotter contacts *p*1 to *p*0 and *ea*, as break-make contacts over the break sides of which the rectifiers are connected to a shaper voltage.

Further advantages that may be obtained by the use of current direction-dependent resistances will now be explained with reference to FIG. 4, which shows a simplified substitution circuit corresponding to FIG. 2, for a desired current direction of the signal current source G and desired decoupling elements. Upon assuming, for example, that the terminal 1 of the signal current source G is positive with respect to the terminal 2, there will result the following circuit:

3.

$$G\text{ (terminal 1)},\ id1,\ s1,\ R_L1,\ \left[\frac{R_L3,\ \dfrac{K1,\ AWS1}{\phantom{x}},Px \quad Kx\ AWSx,\ AWSyKy,\ s2\left(\dfrac{\dfrac{K2,\ AWS2}{C(s2),\ Ko}}{R_L4,\ R_L2,\ c2}\right)}{C(s1),\ Ko}\right],\ G(2)$$

The marking conductor AWS1 and also the serially disposed marking conductors AWS*x*, AWS*y* and AWS2 will be traversed by current when using in the circuit voltage dependent resistors. However, only the ring cores of the evaluation device AF (FIG. 3) which are linked with the marking conductor AWS1 will be activated, the voltage drops occurring at the decoupling elements K*x*, K*y* and K2, remaining due to the series connections of the other marking conductors, below the critical magnitude and preventing activation of the cores linked with such marking conductors.

Upon using current direction-dependent resistances, for example, rectifiers, the series circuit of a plurality of marking conductors cannot become active since at least one rectifier, for example, the rectifier K*y* acts in blocking direction, thus preventing current flow over another private conductor, in the instant case the conductor *s*2. In case an ambiguous result is registered by the signal receivers S1 to S0, due to a defective rectifier, such rectifier can be in simple manner determined by the identification device, by change of polarity of the signal receiver inputs, in the course of the usual testing operation conducted for the determination of the subscriber station number.

In order to explain this operation, it shall again be assumed that the terminal 1 of the signal current source G is positive with respect to the terminal 2, assuming also that the rectifiers are, as decoupling elements K1 to K*y*, conductive only in the direction of the marking conductors AWS1 to AWS*y* and that the rectifier K*y* is defective. All marking conductors shown in FIG. 4 would in such case be traversed by current and the registered result would be ambiguous, since all ring cores linked with the marking conductors AWS1, AWS*x* and AWS2 would be registered in the case of directionally oriented signal receiver inputs. Upon changing the polarity of the signal receivers S1 to S0 and repeating the entire testing operation, the ring cores of the signal receivers, which are linked with the marking conductors AWS*y*, will be ascertained, if only the rectifier K*y* is defective, thereby determining the number of the respective marking conductors.

Changes may be made within the scope and spirit of the appended claims which define what is believed to be new and desired to have protected by Letters Patent.

We claim:

1. A circuit arrangement for identifying the numbers of subscribers to party lines in telephone installations with central toll ticketing, comprising a single transformer matrix consisting of ring-shaped transformer elements which are arranged in columns corresponding in number to the number of digits contained in the longest part line subscriber number and identifying the individual decades, and the elements of each column arranged into a plurality of lines identifying the individual numerical values of each decade, a marking conductor for each party line subscriber number which connects a transformer element from each column, effective as a primary winding and which thus identifies the figure combination corresponding to the associated subscriber number, a decoupling element for each marking conductor, one end of each marking conductor being connected by the associated decoupling element to the associated line to be identified, the other end of each such conductor being fixedly connected with the corresponding ends of other marking conductors of subscribers of the same ordinal numbers, a current source for supplying an identifying signal, allotter contact means for connecting the interconnected ends of such marking conductors, in dependence on the subscriber to be identified, to the one terminal of said current source, and means for connecting the other terminal of said source to the connection line to be identified.

2. A circuit arrangement according to claim 1, comprising, for the identification of the numbers of individual subscriber stations including pay stations and the like, marking conductors for the respective stations which conductors are according to the numbers of such stations likewise linked with respective ring cores of said transformer matrix, the respective marking conductors being as in the case of the party line marking conductors likewise connected, each at one end thereof over a decoupling element, with a terminal which designates the line of the respective stations, the other ends of said conductors being interconnected in groups according to the respective types of stations involved, and allotter contact means for connecting the respective groups of interconnected ends of said conductors with said one terminal of said current source.

3. A circuit arrangement according to claim 2, wherein the switching through of said other terminal of said current source, to the terminal which designates the respective individual station or party line involved in a call, is effected depending upon the actuation of the control member of a relay, which control member is disposed at the calling end of a connection path involved in the respective call and the actuation of which control member is effected responsive to a demand signal transmitted over said connection path.

4. A circuit arrangement according to claim 2, wherein the switching through of said other terminal of said current source, to the terminal which designates the respective individual station or party line involved in a call, is effected responsive to a signal transmitted from a desired point along the connection path extending to the calling end of the respective connection.

5. A circuit arrangement according to claim 2, including charge metering devices wherein the switching through of said other terminal of said current source, to the terminal which designates the respective individual station or party line involved in a call, is in the case of toll calls effected responsive to a signal transmitted from a charge metering device over the connection path extending to the calling end of the respective connection.

6. A circuit arrangement according to claim 2, wherein the switching through of said other terminal of said current source, to the terminal which designates the respective individual station or party line involved in a call, is effected responsive to a signal transmitted from a desired point along the connection path extending to the calling end of the respective connection, said other terminal of said current source being simultaneously connected to the line conductors of the connection path.

7. A circuit arrangement according to claim 2, wherein the switching through of said other terminal of said current source, to the terminal which designates the respective individual station or party line involved in a call, is effected over a private conductor of the respective connection path extending through all selection stages.

8. A circuit arrangement according to claim 2, wherein the switching through of said other terminal of said current source, to the terminal which designates the respective individual station or party line involved in a call, is effected over a private conductor of the respective connection path extending through all selection stages, there being a seizure relay disposed in each selection stage, said seizure relays being supplied with current from a direct current source, the current source which delivers the identification signal and said private conductor and said direct current source being during the identification operations connected in serial relationship.

9. A circuit arrangement according to claim 8, wherein the connection of the current source which delivers the identification signal is effected with the aid of a transformer, the secondary winding of said transformer being disposed in a series circuit including said private conductor and said direct current source.

10. A circuit arrangement according to claim 8, comprising a rectifier disposed in parallel with the current source which delivers the identification signal, said rectifier being polarized so that the counter potential of said direct current source, required for the holding of said seizure relays, is extended to said private conductor.

11. A circuit arrangement according to claim 10, wherein an impulse generator constitutes said current source which delivers the identification signal, said generator being polarized so that the identification impulses are not suppressed by the action of said rectifier and that the impulse delivery is effected in controlled manner.

12. A circuit arrangement according to claim 2, wherein voltage dependent resistances, constitute said decoupling elements.

13. A circuit arrangement according to claim 2, wherein current direction-dependent resistances constitute said decoupling elements.

14. A circuit arrangement according to claim 13, wherein said allotter contacts, which operate for closing the identification circuits, are constructed as break-make contacts, a shaping voltage source, said current direction-dependent resistances being connection with said shaping voltage source over the break-side of the respective contacts.

15. A circuit arrangement according to claim 14, comprising signal receivers which may be coupled with transformer elements of said matrix, and means for operatively connecting said signal receivers with a delay.

16. A circuit arrangement according to claim 15, wherein said signal receivers are, for the determination of defective decoupling elements, arranged for switch-over operation, whereby input signals can be evaluated in one or another direction.

References Cited by the Examiner

UNITED STATES PATENTS

| | | | |
|---|---|---|---|
| 2,854,517 | 9/1958 | Heetman | 179—18.61 |
| 2,955,160 | 10/1960 | McCreary | 179—17.1 |
| 3,025,355 | 3/1962 | Confield et al. | 179—17.1 |

ROBERT H. ROSE, *Primary Examiner.*

H. BOOHER, H. ZELLER, *Assistant Examiners.*